United States Patent [19]
Moore

[11] Patent Number: 6,035,016
[45] Date of Patent: Mar. 7, 2000

[54] SUPPLEMENTAL DATA TRANSMISSION SYSTEM FOR A PARALLEL, DIRECT COMMUNICATION TO LAW ENFORCEMENT AND SECURITY PERSONNEL WHEN A SIGNAL FROM AN EMERGENCY ALARM IS TRANSMITTED

[76] Inventor: Boyd B. Moore, 427 Mignon, Houston, Tex. 77024

[21] Appl. No.: 09/019,073

[22] Filed: Feb. 5, 1998

[51] Int. Cl.[7] .................................................. H04M 11/04
[52] U.S. Cl. .............................................. 379/45; 379/37
[58] Field of Search ............... 379/37–51; 340/531–533, 340/539, 540, 541

[56] References Cited

U.S. PATENT DOCUMENTS

| | | | |
|---|---|---|---|
| 3,914,692 | 10/1975 | Seaborn, Jr. ............................... | 379/38 |
| 4,887,291 | 12/1989 | Stillwell ..................................... | 379/50 |
| 5,195,126 | 3/1993 | Carrier et al. ............................. | 379/45 |
| 5,333,173 | 7/1994 | Seazholtz et al. ........................ | 379/45 |
| 5,805,670 | 9/1998 | Pons et al. ................................. | 379/45 |

*Primary Examiner*—Wing F. Chan
*Attorney, Agent, or Firm*—Fulbright & Jaworski; Paul E. Krieger; Jan K. Simpson

[57] ABSTRACT

A method for alerting law enforcement and/or security or monitoring personnel to an activated security system includes the steps of automatically placing a first telephone call from a first calling number of a security system to a predetermined called number, responsive to detection of an abnormal condition, detecting when the first call is placed, and automatically transmitting information to one or more information receiving devices in the custody or control of said personnel identifying the security system.

6 Claims, 5 Drawing Sheets

SUPPLEMENTAL DATA TRANSMISSION SYSTEM FOR A PARALLEL, DIRECT COMMUNICATION TO LAW ENFORCEMENT AND SECURITY PERSONNEL WHEN A SIGNAL FROM AN EMERGENCY ALARM IS TRANSMITTED

BACKGROUND OF THE INVENTION

1. Field of the Invention

The present invention relates to a system and method for reducing law enforcement response times by utilizing an automatic, supplemental data transmission system to communicate warning signals and other information directly to law enforcement or security personnel (hereinafter called "officers"), instead of going through a dispatcher or other intermediaries. This invention is an improvement over the automated, auxiliary data transmission link described in U.S. patent application Ser. No. 787,978, filed Jan. 22, 1997, entitled "Automated Data Transmission Link to Law Enforcement and Security Personnel," in which the inventor of the invention of this application is a co-inventor.

2. Description of the Related Art

Industrial business sites, as well as other businesses and residences, are a frequent target of theft. Many businesses are left deserted at night, weekends and holidays, especially smaller businesses without night-time security personnel. To make matters worse, many industrial sites are located in relatively remote areas, and often house expensive and easily transported machinery. Computers and other electronics, for example, are readily resold and make lucrative targets for burglars. The loss of such equipment and the data it contains can result in a great deal of disruption to a business.

To combat industrial theft, many businesses rely on access and security systems maintained by a security service provider. These security systems, while generally effective, are not without shortcomings. In a typical operation, a security system with various sensors (such as motion sensors and smoke detectors) is installed at the "secured" site. The security system is typically connected to at least one phone subscriber line. Following detection of an intruder or other emergency event, the security system is configured to communicate a warning signal to the security service provider via an automatic telephone call or radio message.

Warning calls placed to the security service provider are handled by an operator or employee of the service provider. After determining the nature and location of the warning call, the security service provider employee relays the pertinent information to a law enforcement phone operator. In turn, the law enforcement phone operator relays the information to a law enforcement dispatcher. The dispatcher functions to communicate the information to the law enforcement personnel assigned to cover the geographic region (typically referred to as a "zone") in which the industrial site is located. The same procedure is generally followed when an intruder is detected in a secured residential site. Frequently, however, because of the time this procedure takes, the intruders have left the scene by the time law enforcement personnel are able to respond.

Numerous factors add to the sometimes lengthy response times. First, the operators who handle calls for the security service providers are often overworked and/or undertrained. After receiving a telephone or radio warning call from a security system, the operators may waste precious time deciphering the warning message before communicating it to the law enforcement phone operator. Occasionally, inaccurate information is conveyed due to human error. In addition, security service providers are not allowed a separate direct line to the police department—they must use the law enforcement emergency line that is frequently busy during peak hours. Delays of over ten minutes in completing such a call are not uncommon.

Additional delay arises due to the finite amount of time required for the law enforcement phone operator to relay the warning information to the dispatcher, and for the dispatcher to relay the information to the appropriate group of patrol cars (i.e. the cars assigned to the zone in which the secured site is located). Again, the problem is exacerbated during peak crime hours when numerous calls can be received by the dispatcher in a short period of time.

Further, sophisticated criminals have devised methods of circumventing traditional security measures. For example, many savvy burglars carry portable police scanners. When the police dispatcher relays a call to patrol cars, the burglars are able to intercept the communication and time their departure accordingly. It would therefore be desirable to devise a system wherein warning signals and other information are communicated to cars or other security personnel via secure means that bypass communications over normal police channels. Such a system would ideally also eliminate the possibility of human error in communicating the pertinent information.

Various schemes have been devised for automatically notifying authorities of an emergency. Most of the proposed solutions involve extensive use of the public switched telephone network (PSTN) and eventual human intervention in determining how to decipher and forward the emergency information. In addition, automated paging and telemetry systems, such as those disclosed in U.S. Pat. No. 4,856,047 issued to Saunders and U.S. Pat. No. 4,887,291 issued to Stillwell, generally disclose automated communication of a message via a paging system.

These problems were solved by the invention in the pending U.S. patent application Ser. No. 787,978 identified above, in which a sensor coupled to a security system detects a signal transmitted by an alarm when it is triggered. The signal is transmitted automatically to a processing computer which, in turn, calls paging devices or other receivers in the possession or control of the officers and transmits information about the whereabouts of the alarm. In this way the information is transmitted to the officers much faster than through the central dispatcher and eliminates the possibility of the burglars intercepting the information over the airwaves.

However, concerns have been raised by alarm companies that the installation or use of such a sensor could affect the operation of the alarm which, although such concerns are unjustified, could potentially operate as an impediment to the widespread acceptance of the auxiliary system. In addition, the auxiliary system requires additional hardware and installation costs for the sensors, automatic dialers and computers, which add substantially to the overall cost of the service.

SUMMARY OF THE INVENTION

Briefly, the present invention is an improvement aver the invention described in U.S. patent application Ser. No. 787,978, by providing an even shorter response time to emergency events and eliminating hardware and installation costs in a system that can be administered by the provider of the service.

The present invention utilizes telephone company technology so that when an alarm is triggered and a signal is transmitted to its monitoring service, a parallel call is automatically placed directly to law enforcement personnel, instead of being relayed through the dispatcher or other central operator. Most alarm systems work by generating a signal when the alarm is activated, which causes a telephone call to be made to an alarm company monitor that, in turn, calls the central dispatcher via wireless and/or landline connection to report the emergency event and provide relevant information about the event and its location.

The invention in U.S patent application Ser. No. 787,978, provided an auxiliary data transmission link directly to the officers by generating a second signal from a sensor coupled to the alarm which placed a call, through an automatic dialer located at the alarm site, to a computer which automatically called a pager company, that in turn transmitted an alpha-numeric message to pagers or the like carried by the officers. The present invention is directed to a supplemental data transmission link that is an improvement over the invention described in the above-identified patent application and eliminates the need for additional hardware and installation costs in a system administered by the service provider.

In accordance with the present invention, the telephone company's computers are programmed to automatically place a call that is ultimately transmitted to pagers or the like carried by or in the vicinity of the officers when the computers recognize that a call has been made from the number of the alarm to the number of the monitor. When this match occurs, the computers are programmed to automatically call the pre-programmed number(s) of the pagers or the like. The Caller I.D. feature functionality of the telephone company computers is programmed to transmit alpha-numeric data to the officers indicating the whereabouts of the event and other relevant information.

Alternatively, the parallel call can be placed to a central computer operated by the supplemental data transmission service provider which, in turn, is programmed to automatically place a call to pagers or the like carried by or in the custody or control of the officers. The service company's computer is programmed to transmit the alpha-numeric alarm information when it identifies the number from which the call is made. This latter system could be useful by providing the service provider with direct control over data entry for pager numbers when multiple patrol districts are involved and numbers must be added or changed on a regular basis.

The invention eliminates the need for a sensor to be coupled to a security system and an automatic transmitter for initiating a call when the system generates an alarm signal. Thus, the installation and hardware costs for those items are not necessary. In addition, response time is improved because the parallel call is automatically placed within the telephone company database, which eliminates the need for a separate call to the pagers when the alarm is triggered. The invention also provides a universal auxiliary transmission link so that one pager carried by the officers can be called when alarms from different alarm companies are triggered, which eliminates the need for officers to carry a separate pager for each alarm company.

It will become apparent from the following description that the invention is capable of numerous other and different embodiments and applications, and that various details of the invention are capable of modifications without departing from the spirit of the invention as set forth in the appended claims, nor exceed the scope thereof. Accordingly, the drawings and descriptions are to be regarded as illustrative in nature, and not as restrictive.

BRIEF DESCRIPTION OF THE DRAWINGS

A better understanding of the present invention can be obtained when the following detailed description of exemplary embodiments is considered in conjunction with the following drawings, in which.

DETAILED DESCRIPTION OF THE PREFERRED EMBODIMENT

Figure 1:
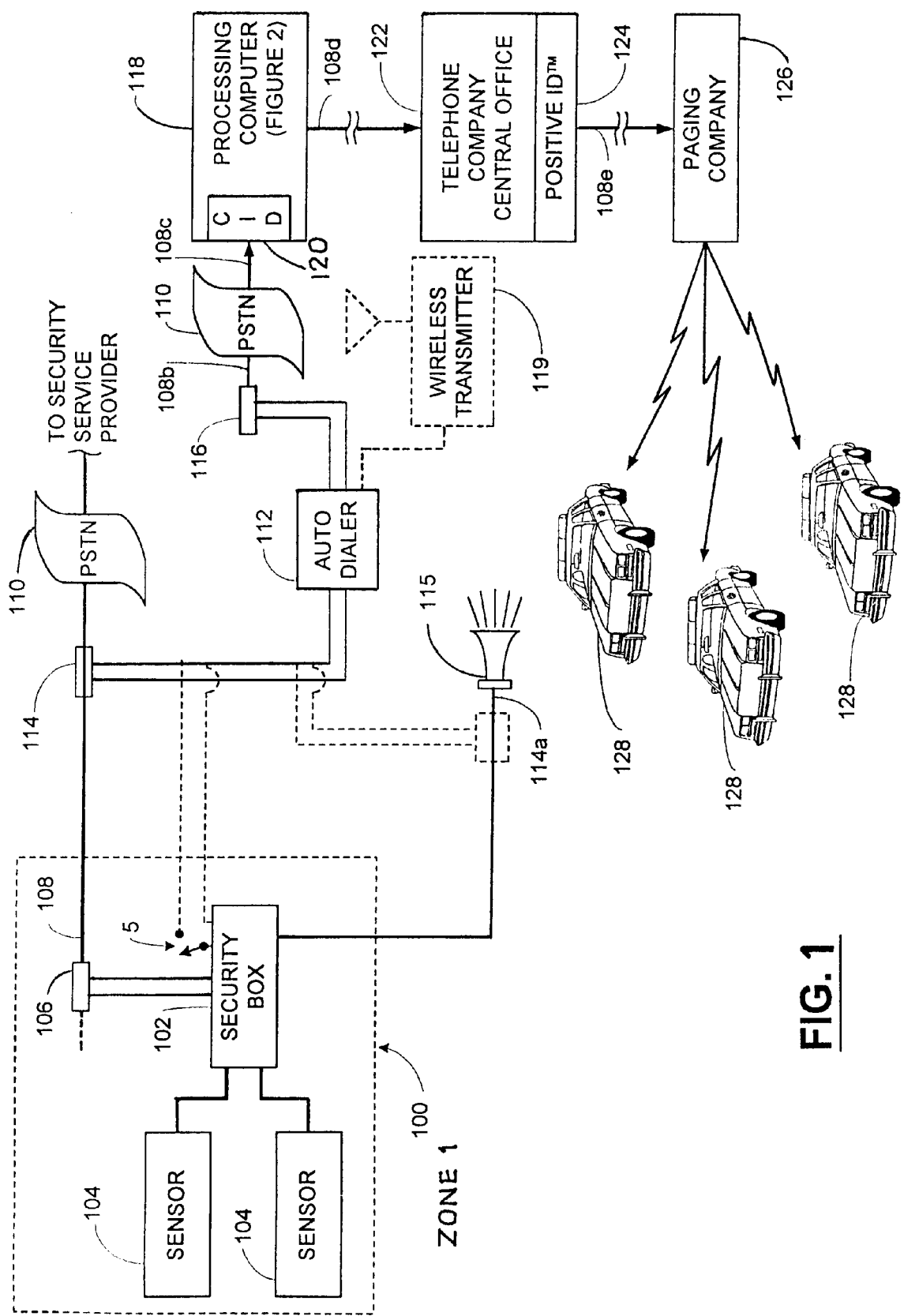
FIG. 1 is a functional block diagram of an automated data transmission system according to the invention in U.S patent application Ser. No. 787,978.

Referring now to FIG. 1, a functional block diagram of the auxiliary, automated data transmission system for law enforcement personnel, which is the subject of U.S. patent application Ser. No. 787,978, is shown. The automated data transmission system is preferably installed in parallel with standard security systems, but alternatively could be used in place of these security systems. The system shown in FIG. 1 enhances the security provided by standard security systems and greatly reduces law enforcement personnel response times.

Referring to FIG. 1, a standard security system 100 is used to secure a residential or industrial site in a specified region (Zone 1). The standard security system 100 generally includes one or more security control boxes 102 which contain an automatic dialing device and message generator. The security control box 102 interfaces with a group of sensors 104. The sensors 104 are generally configured to detect a wide variety of abnormal activities associated with an intruder or other emergency condition. For example, motion sensors, temperature sensors, and other sensors capable of detecting an opened window or door are commonly employed. If more than one security control box 102 is used, one could monitor the inside of a building while another could monitor the surrounding property, including the perimeter of the secured site.

As is common with security systems 100, the security control box 102 is coupled to a subscriber line 108 (also referred to as a loop) via an USOC RJ31 alarm interface 106 or similar telephone line connection. The subscriber lines 108 is used to communicate emergency information to the security service provider (not shown), usually through the Public Switch Telephone Network (PSTN) 110. The security control box 102 is configured to receive information from the sensors 104 and analyze the information to determine whether a predefined condition exists. If an abnormal condition is detected, information regarding the nature and location of the intrusion is converted into a format utilized by the security service provider. Typical protocols used by security service provides include contact ID, Modem–2, and SIC4+2, among others.

The automated data transmission system shown in FIG. 1 was designed to operate in parallel with the standard security system 100, and eliminate delays that are normally associated with standard security systems. In the disclosed embodiment, a sensor such as a passive, non-contact Hall effect device or inductive coupler 114 is coupled to the subscriber line 108. The Hall effect device 114 is capable of detecting activation of the security system by monitoring the subscriber lines 108 for magnetic fields and currents indicative of communications to the security service provider. Alternatively, a Hall effect device 114a, illustrated by broken lines, could be configured to detect activation of the security system 100 directly by sensing current to an alarm such as an electrical horn or siren 115. A sound or light activated switch (not shown) or other passive sensing devices could also be used. It is also contemplated that activation of the security system 100 could be monitored by dry contact switches such as the one designated by reference letter S, also illustrated by broken lines, connected directly to the security control boxes 102.

However, Hall effect devices 114 are preferred due to the fact that the subscriber lines 108 need not be broken in order to detect transmissions. Such use of Hall effect devices 114 or any other similar non-contact sensors does not require any physical alterations to the existing security system 100. Operation of the existing security system 100 is also not affected in the preferred embodiment of the invention, thereby reducing reliability concerns.

Each of the Hall effect devices 114 is individually coupled to an automatic dialing device 112. As is known in the art, the automatic dialer 112 is utilized to automatically dial a predetermined number or data port following reception of an actuation signal. In the disclosed embodiment, the automatic dialer 112 is coupled to a subscriber line 108b via a dedicated USOC RJ31 alarm interface 116 or similar known telephone line connection.

In operation, an emergency event is detected by one or more sensors 104, causing security control box 102 to communicate a warning signal over a subscriber line 108. This warning signal is detected by the Hall effect device 114, which communicates an actuation signal to the automatic dialer 112. Upon being activated, the automatic dialer 112 dials a phone number which has been entered into its memory. The predetermined phone number dialed by the automatic dialer 112 corresponds to a processing computer 118 or other computing device. Communications between the automatic dialer 112 and the processing computer 118 are transmitted over a subscriber line 108c to a PSTN 110, which connects the call to the processing computer 118 via another subscriber line 108c.

Figure 2:
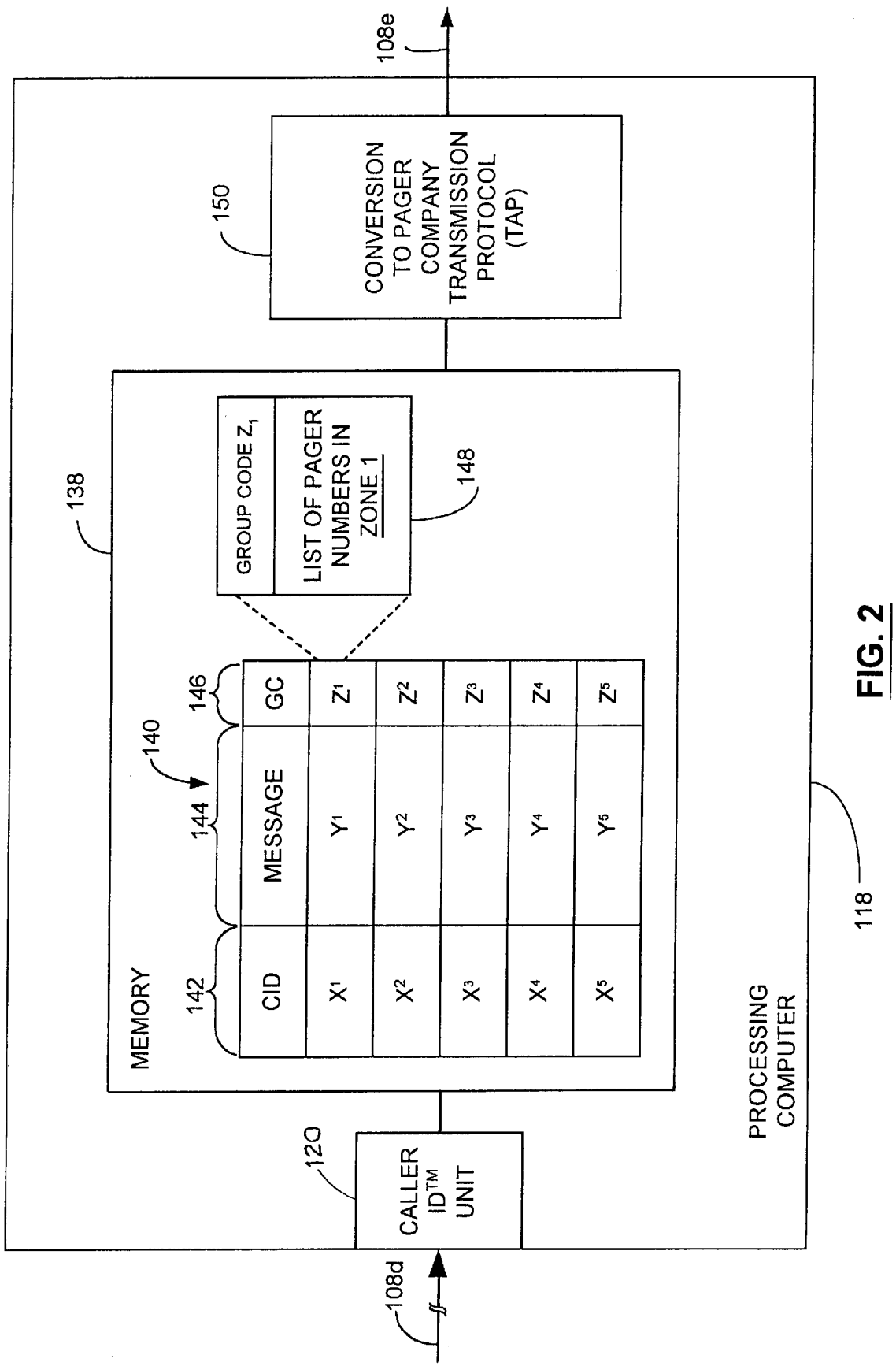
FIG. 2 is a block diagram illustrating the capabilities and database contents of a processing computer according to the invention FIG. 1.

Referring to FIG. 2, the processing computer 118 is preferably capable of Caller ID™ recognition, generally designated by reference numeral 120. Caller ID™ information, as is known to those skilled in the art, allows the processing computer 118 to determine the phone number of the originating automatic dialer 112. Each automatic dialer 112 that contacts the processing computer 118 has an associated phone number X1–X5 that is part of a phone number list 142. The phone number list 142 is part of a larger database 140 maintained within memory 138 of the processing computer 118.

The database 140 associates assorted pieces of information with each phone number in the phone number list 142. This information is represented as message list 144. Each entry Y1–Y5 in the message list 144 includes information important to the operation of the system. Preferably for the security system described, this information can include the name and address of the corresponding business or residential site, the Key map location of the protected site, and the name and phone number of a company contact.

The database 140 also associates an entry Z1–Z5 in a group code list 146 with each auto dialer phone number Z1–Z5. As schematically detailed in element 148 of the database 140, each group code entry Z1–Z5 corresponds to one or more pager numbers to be dialed when an emergency event occurs at a specific protected site. The group codes effectively identify the zone in which the protected site is located.

The processing computer 118 is programmed to determine whether the phone number associated with a received phone call is contained within the phone number list 142. If so, all information corresponding to the phone number is converted into a pager company transmission protocol as shown in information block 150. In the preferred embodiment, information contained within the database 140 is converted into the Telocator Alphanumeric Input Protocol (TAP) prior to being downloaded to a paging company 126 (FIG. 1). This protocol was originally developed to decrease holding times on input lines to alphanumeric systems by allowing off-line entry of paging information to be rapidly communicated to a central paging terminal after connection. The protocol was known as the IXO Alphanumeric Protocol until it was adopted for the input of paging requests. The TAP protocol can be used in either a dedicated or a dial-up telephone line configuration. Details of the conversion to the TAP protocol are known to those skilled in the art.

Returning to FIG. 1, communication of the encoded emergency information for display on a dedicated group of paging devices 152 is now described. After the processing computer 118 has converted the appropriate emergency information for transmission, the information is communicated over a subscriber line 108d to subscriber line interface circuitry within a telephone company central office 122. The preferred embodiment of the invention utilizes a security system known as Positive ID™ 124 to restrict modem-based access to the paging company 126.

Use of Positive ID™ enables the paging company 126 to create predefined authorization profiles specifying the incoming calls that are allowed to access its phone number. The paging company 126 can establish a list of phone numbers and a list of access codes that are allowed to complete a call to a specified number. Calls from phone numbers that have been authorized for clearance are allowed to gain access, while all other calls are denied. Use of Positive ID™ 124 decreases the possibility of unauthorized access to the paging company 126. Positive ID™ is effective in situations in which the dial-up line is a non-dedicated communications line in which a connection is established by dialing the number and access code associated with the destination. The system works with any access arrangement where one system gains access to another via dial-up through a public switch network 110. Authorized phone numbers can be changed, expanded, or updated via a PC interface at any time, or in emergency situations via a touch tone input system.

Assuming the paging company 126 has authorized a telephone call to be received from processing computer 118, the telephone company central office 122 forwards the encoded emergency information to the paging company 126 via subscriber line 108e. Based on information provided by the processing computer 118, the group or zone of paging devices 152 (FIG. 3) will be provided with the emergency information via a paging transmitter (not shown). In the disclosed embodiment, the paging devices 152 are in the possession of law enforcement or security personnel in patrol cars 128. Pagers could also be provided to law enforcement or security personnel on foot, bicycles, horses or other modes of transportation. Preferably, each officer assigned to a particular zone is equipped with his or her own paging device 152. If the number of paging devices 152 is limited, however, law enforcement personnel could simply pass off the devices as shifts are rotated.

Paging companies and Personal Communications Service (PCS) providers generally use the radio spectrum instead of wires to transmit communications to a paging devices 152. The advent of alphanumeric pagers has allowed service providers to transmit short messages to subscribers using paging protocols as an alternative to telephony. Many new advanced paging protocols have emerged. One such protocol is the Flex paging protocol developed by Motorola Inc. Other common pager protocols contemplated for use with the invention include POCSAG and ERMES.

Figure 3:
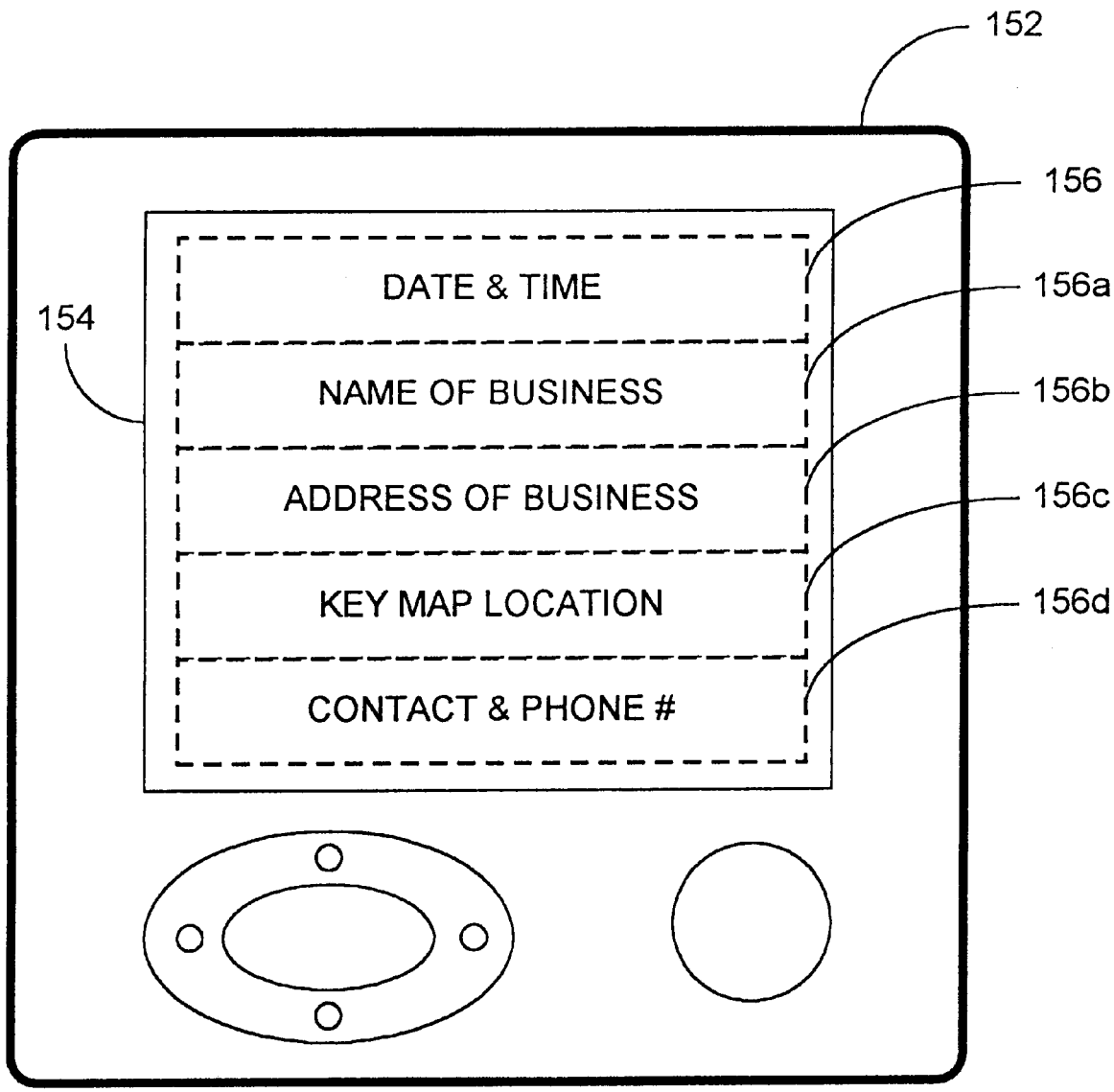
FIG. 3 is an representation of an exemplary alphanumeric paging device display in accordance with the invention of FIG. 1.

Referring now to FIG. 3, each alphanumeric paging device 152 of the disclosed embodiment is capable of displaying written messages, including words and numbers, on an electronic display 154. The electronic display 154 of the paging device 152 can preferably display at least 80 characters on a total of 4 lines. The electronic display 154 provides law enforcement personnel with the assorted emergency information as provided by the processing computer 128. In particular, examples of information that can be communicated include the date and time 156, the name of the protected residential or industrial site 156*a*, the address of the site 156*b*, the Key map location of the site 156*c*, and the name of a contact and his/her phone number 156*d* for alerting the property owner of a potential problem. The information communicated by the display 154 allows the appropriate law enforcement personnel to quickly determine the zone and location of the industrial or residential site whose security system 100 has been triggered.

Preferably, each paging device 152 used in a particular zone can be coded by the paging company 126 to respond to a single paging number. Alternatively, the alphanumeric paging devices 152 in a given zone are configured by the paging company 126 to individually respond to the one number in the set of pager numbers provided by the processing computer 152.

Modifications and alternatives to the embodiment described above were described. For example, the processing computer 118 could be located at the secured industrial or residential site, eliminating the need for subscriber lines 108*b* and 108*c*. Alternatively, emergency information from the secured site could be communicated to the processing computer 118 via wireless communications using a protocol such as cellular data packet data (CDPD). With the CDPD standard, short bursts of data—packets—like addresses and telephone numbers are transmitted over idle cellular voice channels using a cellular phone module or computing device with a CDPD modem. CDPD utilizes the popular Internet protocol and can provide connectionless communications across a cellular network. CDPD is therefore well suited for transactions-based traffic such as database inquiries, dispatch and telemetry.

As mentioned, a digital phone incorporating paging-type communication abilities could also be used as the paging device 152. Specifically, numerous U.S. carriers are deploying handsets with Short Messaging Service (SMS) capabilities based on various transmission technologies (such as CDMA, TDMA, and PCS-1900). SMS permits text messages to be displayed on digital phone handsets. Today's SMS handsets are capable of supporting 9.6 Kbps data transmission with up to 225 characters per message—sufficient for purposes of the present invention.

Figure 4:
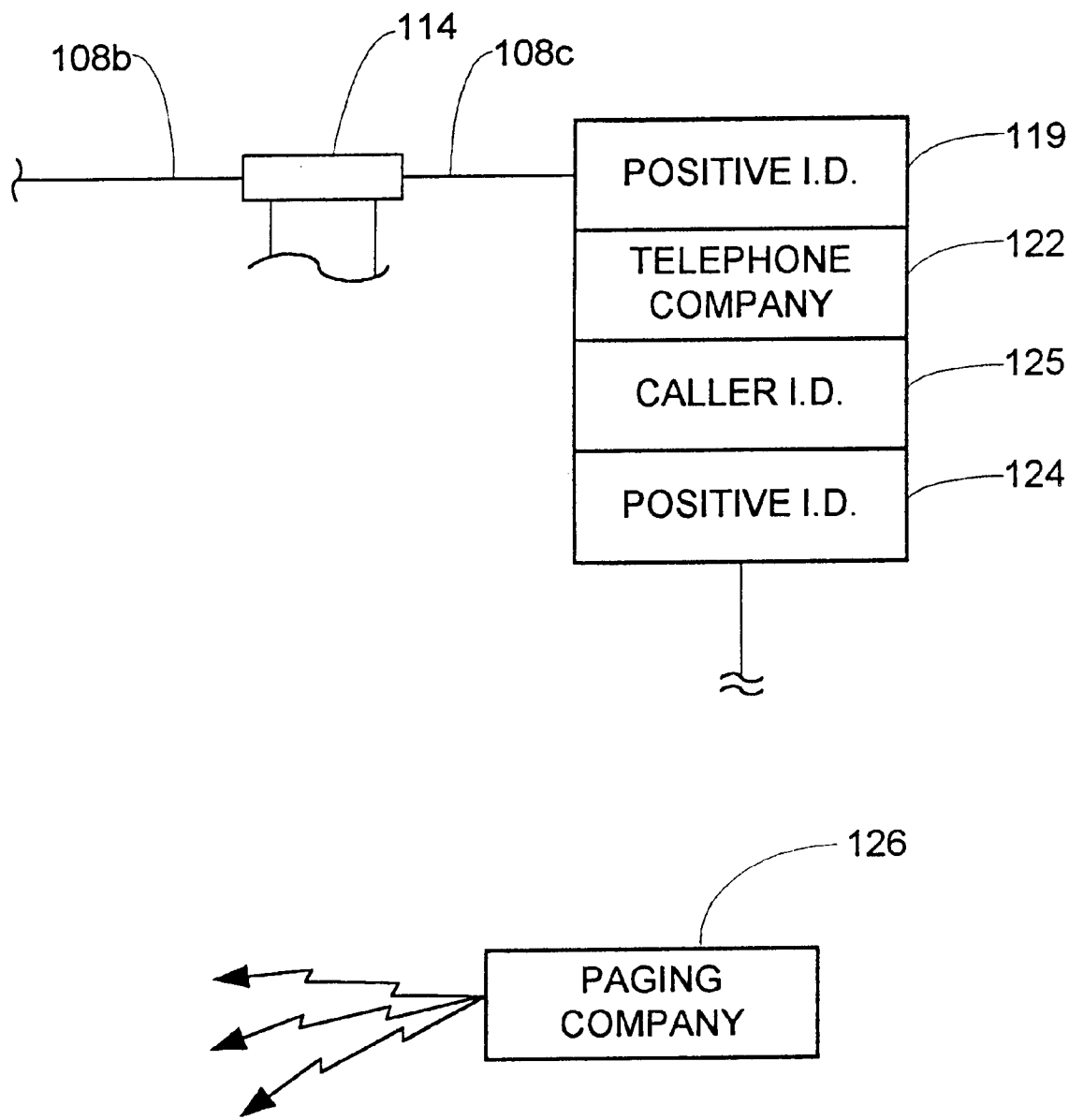
FIG. 4 is a functional work diagram of an alternative embodiment of the invention of FIG. 1 where a telephone company administers the system.

In another embodiment of the invention, shown in FIG. 4, the processing computer 118 can be eliminated and replaced by Positive I.D.® 119 if the system is administered by a telephone company that offers the service. Once the telephone company's Positive I.D. identifies the number of the automatic dialer 112 as one that is authorized to call the pager number, the information in the telephone company's computer programmed for the number of the automatic dialer is sent directly to the pagers through the telephone company's Caller I.D.® 125, eliminating the need for a separate paging company.

In another contemplated embodiment of the invention in the above-identified patent application, the processing computer 118 is maintained by the paging company 126, such that the auto dialer 112 communicates directly with the paging company 126 through a telephone company central office 128. Alternatively, a direct paging method could be utilized wherein the paging transmitter is a dedicated unit placed at the secured industrial or residential site. The paging company 126 is not utilized in this embodiment of the invention, and the processing computer is located at the secured site. Transmitter power generally determines the geographic area covered by this embodiment of the invention.

In yet another embodiment of the invention in the referenced patent application, two-way acknowledgement paging is utilized to allow the system to determine the identity of law enforcement personnel who are actually responding to a warning signal. Suitable two-way messaging and paging protocols include Motorola's proprietary ReFlex protocol and pACT (personal Air Communications Technology), an open protocol that operates in the newly established Narrowband PCS (N-PCS) frequencies and is supported by numerous vendors. The pACT protocol is a derivative of CDPD optimized for two-way paging and short messaging applications.

Figure 5:
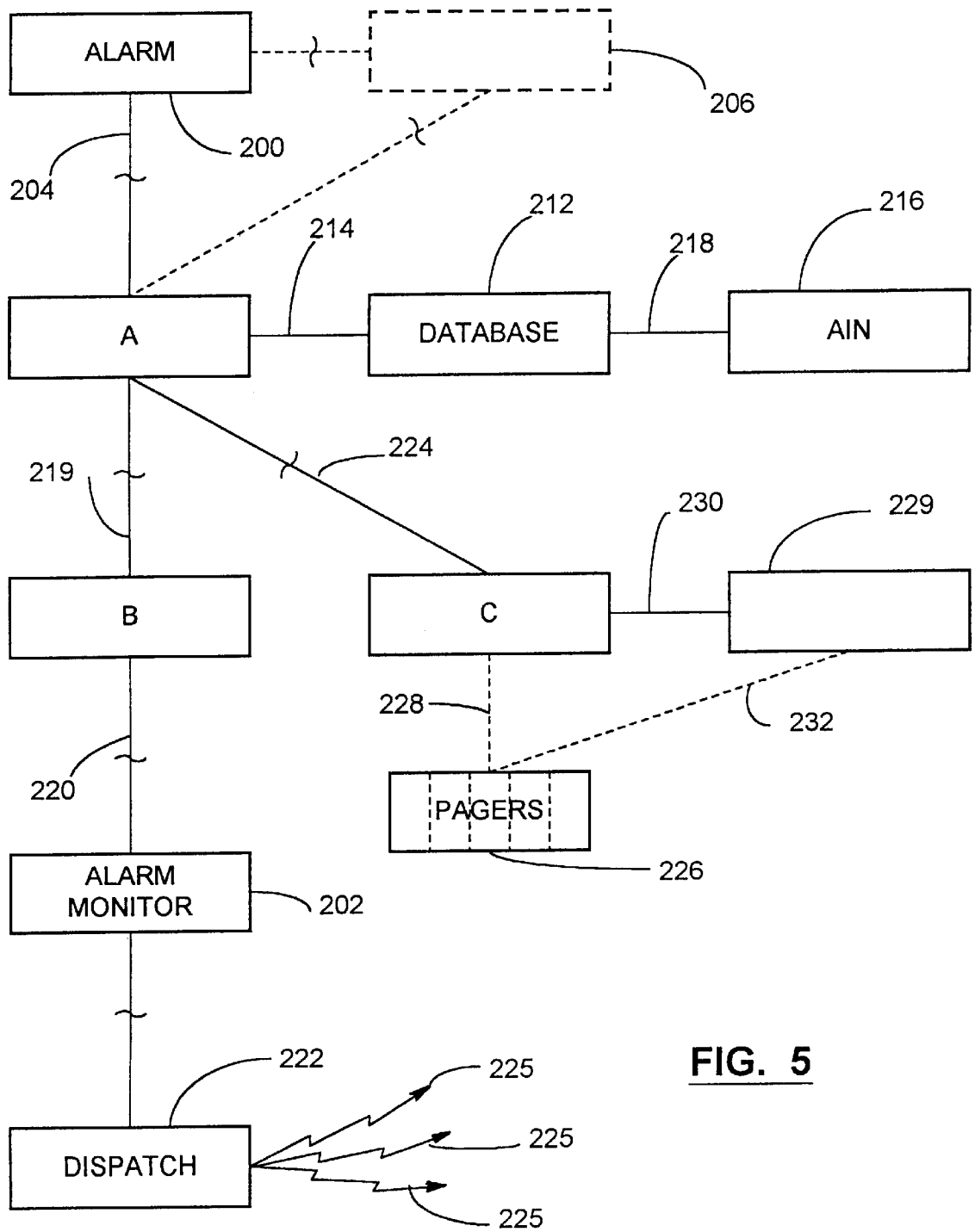
FIG. 5 is a functional work diagram of the improvement of the present invention where the auxiliary transmission link of the invention shown in FIGS. 1–3 is eliminated.

The present invention, shown in FIG. 5, is an improvement over the invention and embodiments described above. Referring to FIG. 5, the diagrammatic representation of the alarm system is identified by reference numeral 200.

As alarm systems typically work, when the alarm 200 is triggered a signal is generated which automatically places a telephone call to an alarm company monitor 202 to Central Office Location A through a land line 204 or, alternatively, via a wireless autodialer 206 shown by broken lines in FIG. 5.

When the call-originating signal is received by the Central Office Location A, a signaling connection is generated to the telephone company database call director 212 via the schematically represented system link 214. The call director 212 is linked to the telephone company's Advanced Intelligence Network ("AIN") 216 as schematically represented by line 218. Through the Caller ID feature finctionality of the AIN or the telephone company's database, pre-programmed alpha-numeric information indicating the alarm location is transmitted via line 219 to the Central Office Location B which in turn is transmitted to the alarm company monitor 202 via line 220. Alarm company personnel or an automatic dialer connected to the alarm company monitor then notifies the central dispatcher 222 of the alarrn's location, who in turn transmits information to the officers over the normal transmission channels, as illustrated by arrows 225.

In accordance with the invention, using recently-developed technology such as Southwestern Bell's Signaling System 7 specification (SS7), when the Central Office Location A transmits a signal for the Central Office Location B to call the alarm company monitor, the AIN 216 is programmed to automatically place a second, parallel call when it detects that a call has been made from the number of the alarm site to the number of the alarm company monitor. When this match is detected, the AIN generates a signal from Central Office Location A to Central Office Location C via line 224. The Central Office Location C in turn transmits the call along with alpha-numeric information about the location of the emergency to the pagers or the like 226 carried by the officers indicated by broken line 228.

Although the invention has been described as operating through three Central Office Locations, A, B and C, this was for illustrative purposes only. The invention could be performed from one or more office locations without departing from the principles of the invention described.

Alternatively, as illustrated by broken lines in FIG. 5, the parallel call and the alpha-numeric information can be transmitted to a computer 229 operated by the service provider, indicated by line 230, which through an automatic dialer (not shown) transmits the call to the pagers 226, as indicated by the line 232. The computer 228 can be programmed to recognize the number of the alarm site and, through the auto-dialer, transmit the information to pagers or the like carried by officers responsible in the location or district of the alarm site. This latter alternative is advantageous when the service provider services multiple patrol districts and/or alarm site numbers must be added or removed on a regular basis.

If the AIN is not programmed to automatically place the second call as described above, the original call to the alarm monitor 202 can be directed first through Central Office Location C to the service provider computer 229, which is programmed not to answer the call but to receive the caller I.D. information from the alarm 200. After a pre-determined number of rings, preferably one or two, the call is then automatically redirected to the alarm monitor 202 through Central Office Locations C and B by means of the Intelligent Redirect capability of the telephone company. After receiving the caller I.D. information, the service provider computer 229 automatically transmits it to the pagers 226 as discussed above.

Thus, a supplemental data transmission system is provided which eliminates the need for additional hardware that must be used in conjunction with existing or newly-installed alarm systems and installation costs for such hardware. Instead, telephone company computers are programmed to automatically place a parallel call to officers or the service provider computer when an alarm signal is generated indicating the alarm has been triggered.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for alerting law enforcement and/or security or monitoring personnel to an activated security system, comprising the steps of:

(a) automatically placing a first telephone call from a first calling number of a security system to a predetermined called number, responsive to detection of an abnormal condition;

detecting when said first call is placed; and (c) automatically transmitting information to one or more information receiving devices in the custody or control of said personnel identifying the security system.

2. The method of claim 1, wherein the information receiving devices comprise one or more devices in the custody or control of said personnel capable of receiving and displaying alpha-numeric information.

3. The method of claim 2, wherein the one or more devices comprise pagers carried by the personnel.

4. The method claim 2, wherein the devices comprise computers in patrol cars under the control of the personnel.

5. The method of claim 1, wherein the information receiving device is a computer programmed to automatically call at least one predetermined called number of at least one information receiving device capable of receiving information identifying the security system.

6. The method of claim 1, and further including the step of automatically transmitting information to a central dispatcher for the personnel at about the same time information is automatically transmitted to send to one or more information receiving devices.

\* \* \* \* \*

UNITED STATES PATENT AND TRADEMARK OFFICE
CERTIFICATE OF CORRECTION

PATENT NO. : 6,035,016
DATED : March 7, 2000
INVENTOR(S) : Boyd B. Moore

Page 1 of 1

It is certified that error appears in the above-identified patent and that said Letters Patent is hereby corrected as shown below:

Related United States Application Data is missing.
Please insert the following on the front page of the letters patent:

-- Continuation-in-part of U.S. Application No. 08/787,978, January 22, 1997.--

Signed and Sealed this

Eleventh Day of September, 2001

*Attest:*

*Nicholas P. Godici*

*Attesting Officer*

NICHOLAS P. GODICI
*Acting Director of the United States Patent and Trademark Office*